United States Patent
Chen

(10) Patent No.: US 9,563,286 B2
(45) Date of Patent: Feb. 7, 2017

(54) OPTICAL NAVIGATION DEVICE AND LIFT DETECTION METHOD THEREOF

(71) Applicant: PixArt Imaging Inc, Hsin-chu County (TW)

(72) Inventor: Tzu-Yu Chen, Hsin-chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 148 days.

(21) Appl. No.: 14/047,542

(22) Filed: Oct. 7, 2013

(65) Prior Publication Data
US 2014/0111437 A1    Apr. 24, 2014

(30) Foreign Application Priority Data

Oct. 22, 2012 (TW) .............................. 101138996 A

(51) Int. Cl.
*G06F 3/03*        (2006.01)
*G06F 3/0354*      (2013.01)

(52) U.S. Cl.
CPC ......... *G06F 3/03543* (2013.01); *G06F 3/0317* (2013.01)

(58) Field of Classification Search
None
See application file for complete search history.

(56) References Cited

U.S. PATENT DOCUMENTS

| | | | |
|---|---|---|---|
| 2006/0091298 A1* | 5/2006 | Xie | G06F 3/0317 250/221 |
| 2006/0125794 A1* | 6/2006 | Afriat | G06F 1/32 345/166 |
| 2008/0278445 A1* | 11/2008 | Sweetser | G06F 3/0346 345/158 |
| 2009/0153486 A1* | 6/2009 | Bohn | G06F 3/03543 345/166 |
| 2011/0157407 A1* | 6/2011 | Lin | G06K 9/036 348/222.1 |
| 2011/0261231 A1* | 10/2011 | Chen | G06F 3/0317 348/239 |
| 2012/0038554 A1 | 2/2012 | Wu et al. | |
| 2012/0127076 A1* | 5/2012 | Song | G06F 3/038 345/166 |

FOREIGN PATENT DOCUMENTS

TW    200632861 A    9/2006
TW    201207673 A    2/2012

* cited by examiner

*Primary Examiner* — Chad Dicke
(74) *Attorney, Agent, or Firm* — Hauptman Ham, LLP

(57) ABSTRACT

An optical navigation device includes a light source, an image sensor, a navigation unit and a lift detection unit. The light source is configured to illuminate a work surface. The image sensor receives reflected light from the work surface to output an image frame. The navigation unit is configured to filter the image frame and output a filtered image frame. The lift detection unit is configured to calculate a maximum difference of intensities between two adjacent pixels in the image frame, calculate a pixel number of pixels of interest in the filtered image frame, and identify a lift event by comparing the maximum difference with a difference threshold and/or comparing the pixel number with an operating threshold.

14 Claims, 4 Drawing Sheets

OPTICAL NAVIGATION DEVICE AND LIFT DETECTION METHOD THEREOF

CROSS REFERENCE TO RELATED APPLICATION

This application claims the priority benefit of Taiwan Patent Application Serial Number 101138996, filed on Oct. 22, 2012, the full disclosure of which is incorporated herein by reference.

BACKGROUND

1. Field of the Disclosure

This disclosure generally relates to an input device and, more particularly, to an optical navigation device and a lift detection method thereof.

2. Description of the Related Art

In an image user interface, generally at least one input device is used to interact with a host, such as a personal computer. For example, it is able to use an optical mouse to move a cursor to a specific position and perform the icon selection so as to activate a specific application. According to the user habit, the optical mouse may be lifted off a work surface in order to change the position thereof on the work surface, but the cursor position is not desired to be moved during the optical mouse leaving the work surface. Therefore, it is necessary to stop the displacement detection once the optical mouse is lifted off the work surface.

The lift detection method of the conventional optical mouse is generally to dispose a sensing device, such as an impedance sensor, a capacitance sensor or a pressure sensor on a bottom surface thereof so as to detect the parameter variation before and after a lift motion. However, the additional sensing device can increase both the device cost and the power consumption.

Accordingly, the present disclosure further provides an optical navigation device and a lift detection method thereof that do not need the additional sensing device so as to reduce the cost. In addition, as the lift detection method of the present disclosure is implemented by algorithm, it may cooperate with conventional detection methods thereby improving the practicality.

SUMMARY

The present disclosure provides an optical navigation device and a lift detection method thereof that have higher detection accuracy and adaptability.

The present disclosure provides an optical navigation device including a light source, an image sensor, a navigation unit and a lift detection unit. The light source is configured to illuminate a work surface. The image sensor is configured to receive reflected light from the work surface to output an image frame. The navigation unit is configured to filter the image frame and output a filtered image frame. The lift detection unit is configured to calculate a maximum difference of intensities between two adjacent pixels in the image frame, calculate a pixel number of at least one pixel of interest in the filtered image frame and identify a lift event according to at least one of (i) when the maximum difference is lower than a difference threshold and (ii) when the pixel number is lower than an operating threshold.

The present disclosure further provides an optical navigation device including a light source, an image sensor, an image processing unit, a navigation unit and a lift detection unit. The light source is configured to illuminate a work surface. The image sensor is configured to receive reflected light from the work surface to output an image frame. The image processing unit is configured to pre-process the image frame to increase an image contrast of the image frame and output a pre-processed image frame. The navigation unit is configured to filter the pre-processed image and output a pre-processed and filtered image frame. The lift detection unit is configured to calculate a maximum difference of intensities between two adjacent pixels in the pre-processed image frame, calculate a pixel number of at least one pixel of interest in the pre-processed and filtered image frame and identify a lift event according to at least one of (i) when the maximum difference is lower than a difference threshold and (ii) when the pixel number is lower than an operating threshold.

The present disclosure further provides a lift detection method of an optical navigation device including the steps of: capturing, using an image sensor, an image frame of a work surface; filtering, using a navigation unit, the image frame to output a filtered image frame; and calculating, using a lift detection unit, a maximum difference of intensities between two adjacent pixels in the image frame, calculating a pixel number of at least one pixel of interest in the filtered image frame and identifying a lift event according to at least one of (i) comparing the maximum difference with a difference threshold and (ii) comparing the pixel number with an operating threshold.

In one aspect, the lift detection method further includes a step of: pre-processing, using an image processing unit, the image frame to increase an image contrast of the image frame to output a pre-processed image frame to replace the image frame; wherein the navigation unit is configured to filter the pre-processed image frame and output a pre-processed and filtered image frame, and the lift detection unit is configured to calculate a maximum difference of intensities between two adjacent pixels in the pre-processed image frame and calculate a pixel number of at least one pixel of interest in the pre-processed and filtered image frame.

In one aspect, the pixel of interest is the pixel having a characteristic value larger than a characteristic threshold.

In one aspect, the lift detection unit may count an event count of the lift event and enter a lift-off mode when the event count is larger than a counting threshold.

In one aspect, the control unit may control the light source and the image sensor to adjust the operation state thereof according to the lift event.

In one aspect, the lift detection unit may compare an nth largest difference of intensities between two adjacent pixels with the difference threshold so as to eliminate the possibility of misidentification.

In the optical navigation device and the lift detection method according to the embodiment of the present disclosure, the lift event is identified by means of data processing such that no additional sensing device is necessary. The present disclosure may cooperate with the detection method employing additional sensing devices thereby having a higher adaptability.

The lift detection method according to the embodiment of the present disclosure itself has the improved mechanism to confirm a lift event, e.g. counting the lift event, enhancing the image contrast and/or adjusting every threshold according to the contrast enhancement parameter, thereby having higher identification accuracy.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
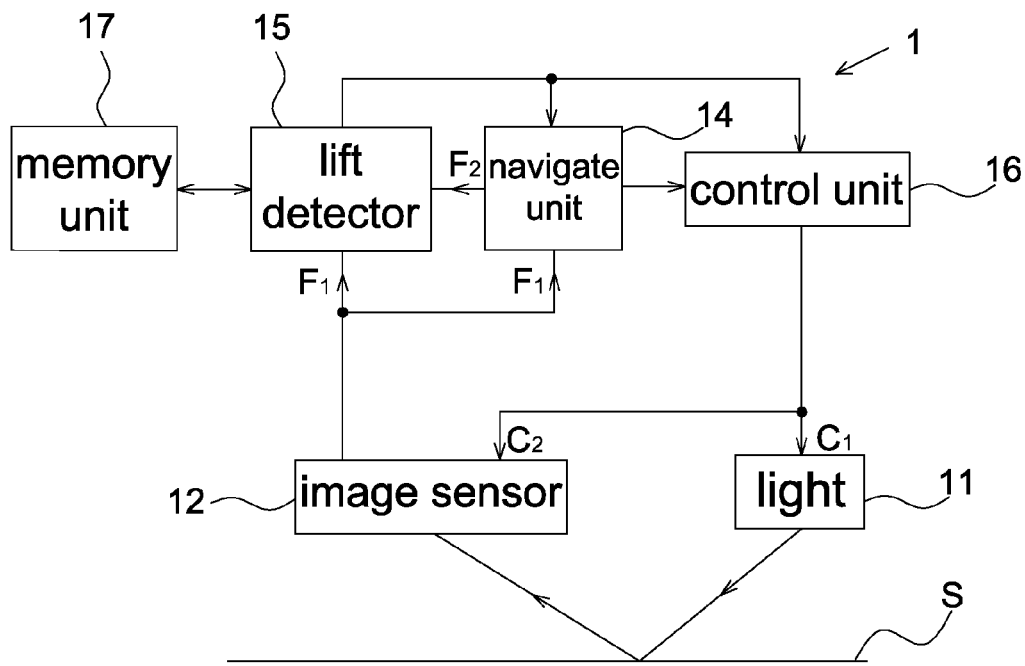
FIG. 1 shows a schematic block diagram of the optical navigation device according to a first embodiment of the present disclosure.

Referring to FIG. 1, it shows a schematic block diagram of the optical navigation device according to a first embodiment of the present disclosure. The optical navigation device 1 is adapted to be operated on a work surface S so as to detect a relative motion with respect to the work surface S, e.g. calculating a transverse displacement parallel to the work surface S and identifying a lift event perpendicular to the work surface S, wherein the transverse displacement may be calculated using conventional methods, e.g. calculating the correlation between image frames. When the lift event is detected or reaches a predetermined number, a life-off mode is entered and the transverse displacement may not be calculated or outputted.

The optical navigation device 1 includes a light source 11, an image sensor 12, a navigation unit 14, a lift detection unit 15, a control unit 16 and a memory unit 17, wherein the navigation unit 14, the lift detection unit 15 and the control unit 16 may be, but not limited to, implemented by a digital signal processor (DSP), and the memory unit 17 may or may not be included in the DSP. It is appreciated that the optical navigation device 1 may further include one or a plurality of optical components (not shown) configured to adjust the optical path.

The light source 11 may be implemented by one or a plurality of light emitting diodes, laser diodes or other active light sources and configured to illuminate the work surface S. The light source 11 may emit light having a wavelength used in the conventional optical mouse, e.g. invisible light or red light, without any limitation. In addition, according to different applications, the light source 11 may emit light at a fixed or variable lighting frequency. The lighting duration each time the light source 11 emitting light may be adjustable or fixed according to different applications.

The image sensor 12 may be a CCD image sensor, a CMOS image sensor or other sensing devices adapted to sense optical energy. The image sensor 12 is configured to receive reflected light from the work surface S to output an image frame $F_1$. In addition, the image sensor 12 may capture image frames $F_1$ at a fixed or variable sampling frequency. The exposure parameter (e.g. the exposure time and image gain) of the image sensor 12 may be adjustable or fixed according to different applications.

The navigation unit 14 is configured to calculate a transverse displacement of the optical navigation device 1 with respect to the work surface S. The navigation unit 14 may perform the filtering on the image frame $F_1$ before calculating a transverse displacement and then calculate the transverse displacement according to the filtered image frame. For example referring to FIG. 3, it is assumed that the image frame $F_1$ has a size of 7×7 and the navigation unit 14 uses a digital filter FM having a size of 3×3 to filter the image frame $F_1$ so as to reveal the specific characteristic of the image frame $F_1$. For example, in FIG. 3 a filtered image frame $F_2$ has higher characteristic values in some pixel rows (e.g. the second, fifth and seventh pixel rows), and the navigation unit 14 may calculate the transverse displacement according to the correlation between the characteristic values between different filtered image frames $F_2$. In this embodiment, the navigation unit 14 is configured to filter the image frame $F_1$ and output a filtered image frame $F_2$. It should be mentioned that sizes of the image frame $F_1$ and the filtered image frame $F_2$ are not limited to those shown in FIG. 3. The digital filter used by the navigation unit 14 may be those used in the conventional optical mouse.

The lift detection unit 15 receives the image frame $F_1$ from the image sensor 12 and receives the filtered image frame $F_2$ from the navigation unit 14. The lift detection unit 15 is configured to calculate a maximum difference of intensities Pdiff between two adjacent pixels in the image frame $F_1$, to calculate a pixel number Pn of at least one pixel of interest in the filtered image frame $F_2$ and to identify a lift event when the maximum difference Pdiff is lower than a difference threshold TH1 and/or the pixel number Pn is lower than an operating threshold TH2.

Figure 3:
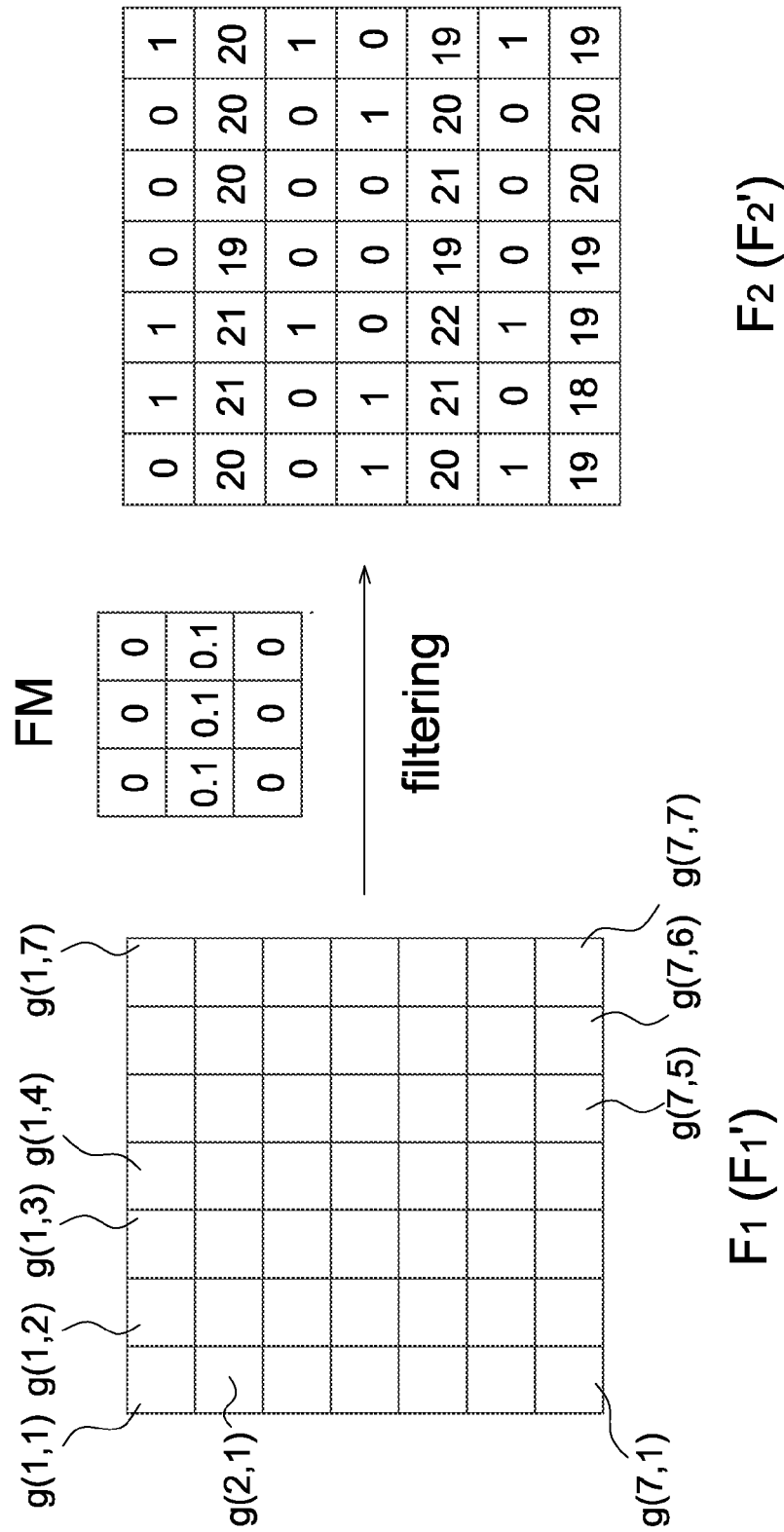
FIG. 3 shows an operational schematic diagram of the lift detection method of an optical navigation device according to the embodiment of the present disclosure.

Referring to FIG. 3 again, it is assumed that pixel gray levels of the image frame $F_1$ are g(1,1), g(1,2), g(1,3) . . . g(7,6) and g(7,7) sequentially. The lift detection unit 15 calculates the difference of intensities between all two adjacent pixels as g(1,1)-g(1,2), g(1,2)-g(1,3) . . . g(7,6)-g(7,7), and obtains a maximum difference of intensities Pdiff (e.g. an absolute value of the difference of intensities herein), wherein when the optical navigation device 1 is lifted off, the maximum difference Pdiff decreases. The lift detection unit 15 also compares a characteristic value of each pixel in the filtered image frame $F_2$ with a characteristic threshold, wherein said pixel of interest is referred to the pixel having a characteristic value larger than the characteristic threshold. For example, if the characteristic threshold in FIG. 3 is set as 10, pixels of interest are referred to the second, fifth and seventh pixel rows in the filtered image frame $F_2$ (i.e. the pixel number Pn is 21), wherein when the optical navigation device 1 is lifted off, the pixel number Pn decreases. When the maximum difference Pdiff is lower than the difference threshold TH1, it means that the image contrast of the image frame $F_1$ is too low and thus it is able to identify that the optical navigation device 1 may be lifted off by the user. When the pixel number Pn is lower than the operating threshold TH2, it means that the image contrast of the filtered image frame $F_2$ is too low and thus it is able to identify that the optical navigation device 1 may be lifted off by the user. In this embodiment, the lift detection unit 15 may identify a lift event according to at least one of the two identification methods mentioned above. It should be mentioned that values of the difference threshold TH1 and the operating threshold TH2 may be determined according to the resolution of the image sensor 12 or the sensitivity of the optical navigation device 1 without any limitation. In other words, the thresholds may be set or adjusted according to the system parameter of the optical navigation device 1 and saved in the memory unit 17.

The control unit 16 may control the light source 11 and/or the image sensor 12 according to the lift event. For example, when a lift event occurs, the control unit 16 may output a control signal $C_1$ to control the light source 11 to stop lighting, to decrease the lighting frequency or lighting duration; for example, when a lift event occurs, the control unit 16 may output a control signal $C_2$ to control the image sensor 12 to stop capturing images, to decrease the sampling frequency or exposure time, i.e. entering a lift-off mode. In addition, during operation the lift detection unit 15 may occasionally detect a lift event due to the characteristic of the work surface S but the optical navigation device 1 is actually not lifted off. Therefore, in order to further improve the identification accuracy, the lift detection unit 15 may be arranged to control the light source 11 and/or the image sensor 12 only when detecting a predetermined number of lift events within a predetermined time interval. More specifically speaking, the lift detection unit 15 may count an event count of the lift event, and the lift-off mode is entered only when the event count within a predetermined time interval is larger than a counting threshold TH3.

In addition, in the lift-off mode the navigation unit 14 may stop calculating the transverse displacement or stop outputting the filtered image frame $F_2$ according to the lift event. In addition, the navigation unit 14 may also inform the control unit 16 to control the light source 11 and/or the image sensor to adjust the operation state thereof according to the calculated transverse displacement.

In some cases, the lift detection unit 15 may detect that the maximum difference Pdiff always appears at the same pixel(s), e.g. the sensing matrix of the image sensor 12 having the damage or defect. Therefore, in order to further improve the identification accuracy, the lift detection unit 15 may compare the nth largest difference of intensities between two adjacent pixels with the difference threshold TH1 so as to identify the lift event, wherein the value of N may be determined according to the actual situation. For example, if the lift detection unit 15 detects that the maximum three differences of intensities Pdiff always appear at the same pixels, N may be selected as 4.

Figure 2:
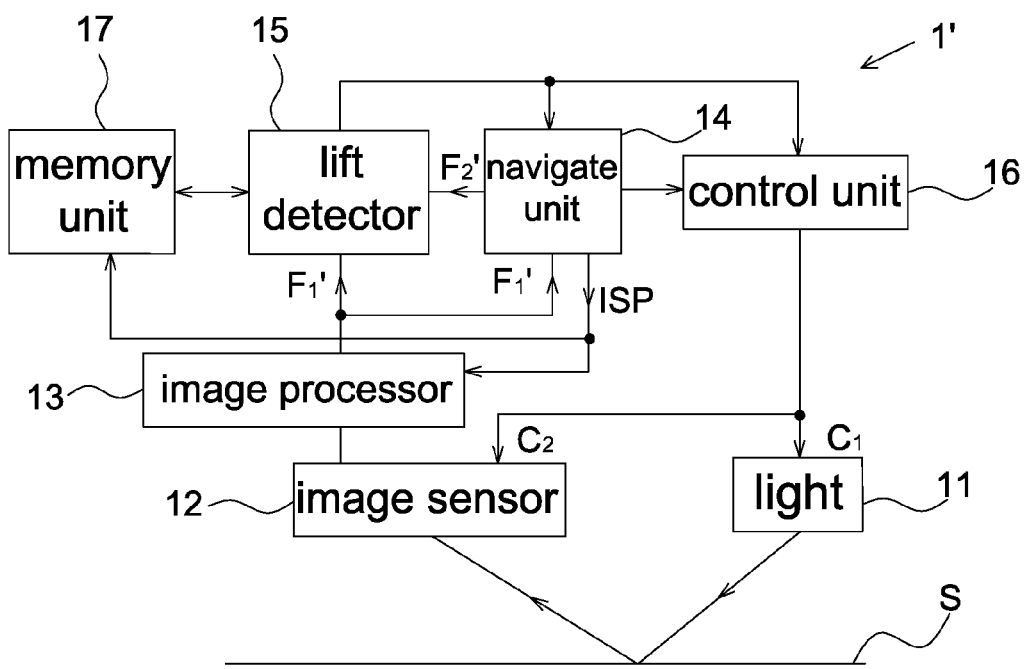
FIG. 2 shows a schematic block diagram of the optical navigation device according to a second embodiment of the present disclosure.

Referring to FIG. 2, it shows a schematic block diagram of the optical navigation device according to a second embodiment of the present disclosure. The optical navigation device 1' includes the light source 11, the image sensor 12, an image processing unit 13, the navigation unit 14, the lift detection unit 15, the control unit 16 and the memory unit 17. The difference between this embodiment and that of FIG. 1 is that in this embodiment the optical navigation device 1' further includes an image processing unit 13 configured to pre-process the image frame $F_1$ so as to increase an image contrast of the image frame $F_1$ and output a pre-processed image frame $F_1'$. Therefore, the navigation unit 14 is configured to filter the pre-processed image frame $F_1'$ and output a pre-processed and filtered image frame $F_2'$. The lift detection unit 15 is configured to calculate a maximum difference of intensities Pdiff between two adjacent pixels in the pre-processed image frame $F_1'$, to calculate a pixel number Pn of pixels of interest in the pre-processed and filtered image frame $F_2'$ and to identify a lift event when the maximum difference Pdiff is lower than the difference threshold TH1 and/or the pixel number Pn is lower than the operating threshold TH2. In other words, the navigation unit 14 and the lift detection unit 15 may perform the same processes as the first embodiment but the processed target is replaced by the pre-processed image frame, wherein said pre-processing may be the contrast enhancement. It is able to use the conventional contrast enhancement method to enhance the image contrast of the image frame $F_1$ so as to improve the accuracy of calculating the transverse displacement and identifying the lift event.

In addition, in the second embodiment the navigation unit 14 may further control a process parameter ISP of the image processing unit 13 according to the received pre-processed image frame $F_1'$, for example, when the navigation unit 14 identifies that the image contrast of the pre-processed image frame $F_1'$ is not good enough, wherein the process parameter ISP may be various parameters used by the image processing unit 13 for enhancing the image contrast. In addition, the navigation unit 14 may also adjust the difference threshold TH1 and/or the operating threshold TH2 saved in the memory unit 17 according to the process parameter ISP.

Figure 4:
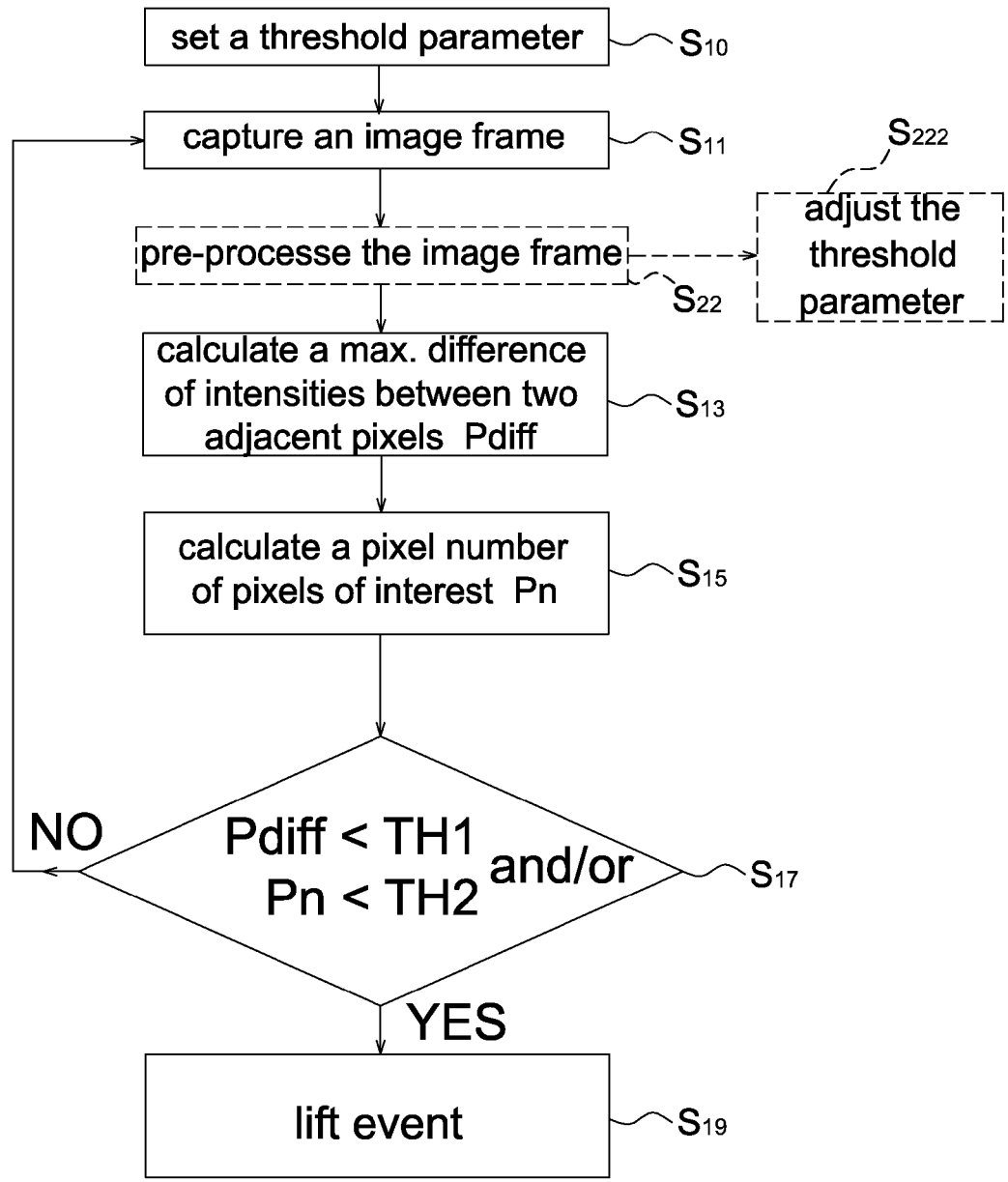
FIG. 4 shows a flow chart of the lift detection method of an optical navigation device according to the embodiment of the present disclosure.
Figure 5:
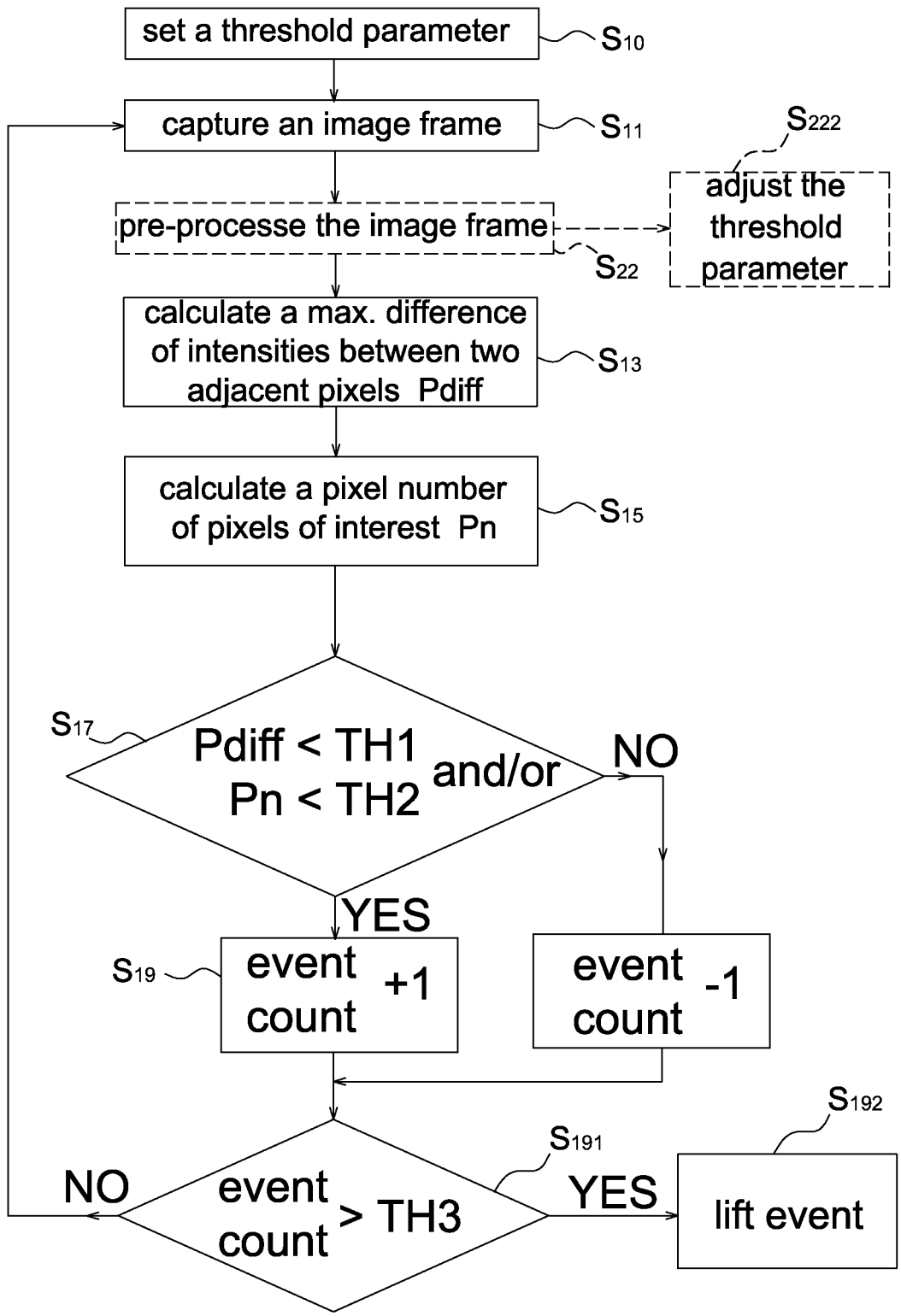
FIG. 5 shows another flow chart of the lift detection method of an optical navigation device according to the embodiment of the present disclosure.

Referring to FIGS. 4 and 5, they show flow charts of the lift detection method of an optical navigation device according to the embodiment of the present disclosure, which include the steps of: setting a threshold parameter (Step $S_{10}$); capturing an image frame (Step $S_{11}$); pre-processing the image frame (Step $S_{22}$); adjusting the threshold parameter (Step $S_{222}$); calculating a maximum difference of intensities Pdiff between two adjacent pixels (Step $S_{13}$); calculating a pixel number Pn of pixels of interest (Step $S_{15}$); comparing the maximum difference Pdiff with a difference threshold TH1 and/or comparing the pixel number Pn with an operating threshold TH2 (Step $S_{17}$); identifying a lift event (counting an event count of the lift event) (Step $S_{19}$); comparing the event count with a counting threshold TH3 (Step $S_{191}$); and entering a lift-off mode (Step $S_{192}$). In FIGS. 4 and 5, Steps $S_{22}$ and $S_{222}$ are the steps of the second embodiment of the present disclosure and thus they are not implemented in the first embodiment; the steps $S_{191}$ and $S_{192}$ may not be implemented in both the first and second embodiments, and thus two figures are shown herein. For simplification, the first and second embodiments are illustrated together. As mentioned above, the main difference between the first and second embodiments is that in the second embodiment the image frame $F_1$ is firstly pre-processed so as to enhance the image contrast thereof, and other steps are identical to those of the first embodiment.

Step $S_{10}$: The threshold parameter including the difference threshold TH1, the operating threshold TH2, the counting threshold TH3 and the characteristic threshold (for identifying the pixel of interest) may be previously saved in the memory unit 17, e.g. before shipment, in the staring procedure or in the user defined setting procedure.

Step $S_{11}$: The image sensor 12 captures an image frame $F_1$ of the work surface S corresponding to the operation of the light source 11.

Refer to the optical navigation device 1 of the first embodiment in FIG. 1.

Step $S_{13}$: The lift detection unit 15 calculates a maximum difference of intensities Pdiff between all two adjacent pixels in the image frame $F_1$.

Step $S_{15}$: The navigation unit 14 filters the image frame $F_1$ and output a filtered image frame $F_2$. For example, FIG. 3 shows that the image frame $F_1$ is filtered by a digital filter FM such that every pixel of the filtered image frame $F_2$ has a characteristic value. The lift detection unit 15 then calculates a pixel number Pn of pixels of interest in the filtered image frame $F_2$. It should be mentioned that the sequence of the Steps $S_{13}$ and $S_{15}$ does not have any limitation.

Refer to the optical navigation device 1' of the second embodiment in FIG. 2.

Step $S_{22}$: The image processing unit 13 pre-processes the image frame $F_1$ so as to increase the image contrast of the image frame $F_1$ and output a pre-processed image frame $F_1'$. Herein the navigation unit 14 filters the pre-processed image frame $F_1'$ and output a pre-processed and filtered image frame $F_2'$. The lift detection unit 15 then calculates the maximum difference of intensities Pdiff between two adjacent pixels in the pre-processed image frame $F_1'$ (Step $S_{13}$) and calculates the pixel number Pn of pixels of interest in the pre-processed and filtered image frame $F_2'$ (Step $S_{15}$). In addition, in the second embodiment the navigation unit 14 may control a process parameter ISP of the image processing unit 13 according to the received image frame $F_1'$ so as to increase the image contrast of the image frame $F_1'$. The navigation unit 14 may further adjust the difference threshold TH1 and/or the operating threshold TH2 saved in the memory unit 17 according to the process parameter ISP.

In the optical navigation device according to the first embodiment of the present disclosure, the pixel of interest is referred to the pixel(s) in the image frame $F_1$ having a characteristic value larger than a characteristic threshold. In the optical navigation device according to the second embodiment of the present disclosure, the pixel of interest is referred to the pixel(s) in the pre-processed image frame $F_1'$ having a characteristic value larger than a characteristic threshold.

Step $S_{17}$: The lift detection unit 15 compares the maximum difference Pdiff with a difference threshold TH1 and/or compares the pixel number Pn with an operating threshold TH2. When the maximum difference Pdiff is larger than (or equal to) the difference threshold TH1 and/or the pixel number Pn is larger than (or equal to) the operating threshold TH2, it means that the optical navigation device 1 may operate normally and the process returns to the Step $S_{11}$ to capture a new image frame $F_1$ and the navigation unit 14 calculates the transverse displacement. When the maximum difference Pdiff is smaller than (or equal to) the difference threshold TH1 and/or the pixel number Pn is smaller than (or equal to) the operating threshold TH2, the process enters the Step $S_{19}$. In addition, as mentioned above in order to prevent the misidentification in some specific cases, the lift detection unit 15 may compare the nth largest difference of intensities between two adjacent pixels with the difference threshold TH1 rather than using the maximum difference Pdiff.

Step $S_{19}$: The lift detection unit 15 identifies that a lift event occurs, and the control unit 16 may directly enter the lift-off mode and control the light source 11 and the image sensor 13 to adjust the operation state thereof (as shown in FIG. 4). In another embodiment, in order to further increase the identification accuracy, the lift detection unit 15 may count an event count of the lift event, e.g. a lift event count is increased by 1 when the maximum difference Pdiff is smaller than (or equal to) the difference threshold TH1 and/or the pixel number Pn is smaller than (or equal to) the operating threshold TH2; a lift event count is decreased by 1 when the maximum difference Pdiff is larger than the difference threshold TH1 and the pixel number Pn is larger than the operating threshold TH2 (as shown in FIG. 5). In this embodiment, a lift-off mode is entered only when the event count is larger than a counting threshold TH3 (Steps $S_{191}$-$S_{192}$). In other words, if the event count does not exceed the counting threshold TH3, the optical navigation device still operates in a normal mode and the image sensor 12 captures a new image frame $F_1$ and operates continuously. The control unit 16 does not control the light source 11 and the image sensor 13 to adjust the operation state thereof according to the lift event until the event count exceeding the counting threshold TH3 or the event count within a predetermined time interval exceeding the counting threshold TH3. In another embodiment, when the maximum difference Pdiff is larger than the difference threshold TH1 and the pixel number Pn is larger than the operating threshold TH2 in the Step $S_{17}$ of FIG. 5, the lift event count may be set to zero and the process returns to the Step $S_{11}$ to capture a new image frame and the optical navigation device still operates in a normal mode.

As mentioned above, as the conventional optical mouse needs an additional sensing device in order to detect whether it is lifted or not, the device cost and the system power consumption can be increased. Therefore, the present disclosure further provides an optical navigation device and a lift detection method thereof (FIGS. 1, 2 and 4) that are implemented by algorithm. Therefore, the additional sensing device is no longer necessary and high detection accuracy is achieved. Furthermore, the present disclosure may cooperate with conventional detection methods so as to improve the practicality.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical navigation device, adapted to be operated on a work surface, the optical navigation device comprising:
   a light source configured to illuminate the work surface;
   an image sensor configured to receive reflected light from the work surface to output an image frame;
   a navigation unit configured to filter the image frame with a digital filter to reveal a gray level characteristic of the image frame and output a filtered image frame; and
   a lift detection unit configured to
      calculate a difference of gray levels between each pair of adjacent pixels for all pairs of adjacent pixels in the image frame which is not filtered by the navigation unit and obtain a maximum difference of the calculated differences of gray levels,
      calculate a number of pixels having the gray level larger than a gray level threshold in the filtered image frame, wherein each pixel having a grey level larger than the gray level threshold is considered a pixel of interest, and
      identify a lift event according to when a second or third largest difference is lower than a predetermined difference threshold and when the number of the at least one pixel of interest is lower than a predetermined operating threshold.

2. The optical navigation device as claimed in claim 1, wherein the lift detection unit is further configured to count an event count of the lift event and enter a lift-off mode when the event count is larger than a predetermined counting threshold.

3. The optical navigation device as claimed in claim 1, further comprising a control unit configured to control at least one of the light source and the image sensor according to the lift event.

4. An optical navigation device, adapted to be operated on a work surface, the optical navigation device comprising:
   a light source configured to illuminate the work surface;
   an image sensor configured to receive reflected light from the work surface to output an image frame;

an image processing unit configured to pre-process the image frame to increase an image contrast of the image frame and output a pre-processed image frame;

a navigation unit configured to filter the pre-processed image frame with a digital filter to reveal a gray level characteristic of the pre-processed image frame and output a pre-processed and filtered image frame; and a lift detection unit configured to calculate a difference of gray levels between each pair of adjacent pixels for all pairs of adjacent pixels in the pre-processed image frame which is not filtered by the navigation unit and obtain a maximum difference of the calculated differences of gray levels, calculate a number of pixels having the gray level larger than a gray level threshold in the pre-processed and filtered image frame, wherein each pixel having a grey level larger than the gray level threshold is considered a pixel of interest, and identify a lift event according to when a second or third largest difference is lower than a predetermined difference threshold and when the number of the at least one pixel of interest is lower than a predetermined operating threshold.

5. The optical navigation device as claimed in claim 4, wherein the lift detection unit is further configured to count an event count of the lift event and enter a lift-off mode when the event count is larger than a predetermined counting threshold.

6. The optical navigation device as claimed in claim 4, wherein the navigation unit is further configured to control a process parameter of the image processing unit to enhance the image contrast.

7. The optical navigation device as claimed in claim 6, wherein the navigation unit is further configured to adjust at least one of the predetermined difference threshold and the predetermined operating threshold according to the process parameter.

8. The optical navigation device as claimed in claim 4, further comprising a control unit configured to control at least one of the light source and the image sensor according to the lift event.

9. A lift detection method of an optical navigation device, the optical navigation device comprising an image sensor, a navigation unit and a lift detection unit, the lift detection method comprising:

capturing, using the image sensor, an image frame of a work surface;

filtering, using the navigation unit, the image frame with a digital filter to reveal a gray level characteristic of the image frame to output a filtered image frame;

calculating, using the lift detection unit, a difference of gray levels between each pair of adjacent pixels for all pairs of adjacent pixels in the image frame which is not filtered by the navigation unit and obtaining a maximum difference of the calculated differences of gray levels;

calculating, using the lift detection unit, a number of pixels having the gray level larger than a gray level threshold in the pre-processed and filtered image frame, wherein each pixel having a grey level larger than the gray level threshold is considered a pixel of interest; and identifying, using the lift detection unit, a lift event according to when a second or third largest difference is lower than a predetermined difference threshold and when the number of the at least one pixel of interest is lower than a predetermined operating threshold.

10. The lift detection method as claimed in claim 9, wherein the optical navigation device further comprises an image processing unit, and the lift detection method further comprises:

pre-processing, using the image processing unit, the image frame to increase an image contrast of the image frame to output a pre-processed image frame to replace the image frame;

wherein, in said filtering, the navigation unit filters the pre-processed image frame and outputs a pre-processed and filtered image frame as the filtered image frame, and wherein, in said identifying, the lift detection unit calculates a difference of gray levels between each pair of adjacent pixels for all pairs of adjacent pixels in the pre-processed image frame and obtains a maximum difference of the calculated differences and calculates a number of at least one pixel of interest having the gray level characteristic larger than a characteristic threshold in the pre-processed and filtered image frame.

11. The lift detection method as claimed in claim 10, further comprising:

controlling, using the navigation unit, a process parameter of the image processing unit to enhance the image contrast.

12. The lift detection method as claimed in claim 11, further comprising:

adjusting, using the navigation unit, at least one of the predetermined difference threshold and the predetermined operating threshold according to the process parameter.

13. The lift detection method as claimed in claim 9, further comprising:

counting, using the lift detection unit, an event count of the lift event; and entering a lift-off mode when the event count is larger than a predetermined counting threshold.

14. The lift detection method as claimed in claim 9, wherein the optical navigation device further comprises a control unit and the lift detection method further comprises:

controlling, using the control unit, the light source and the image sensor according to the lift event.

* * * * *